Patented Sept. 27, 1932

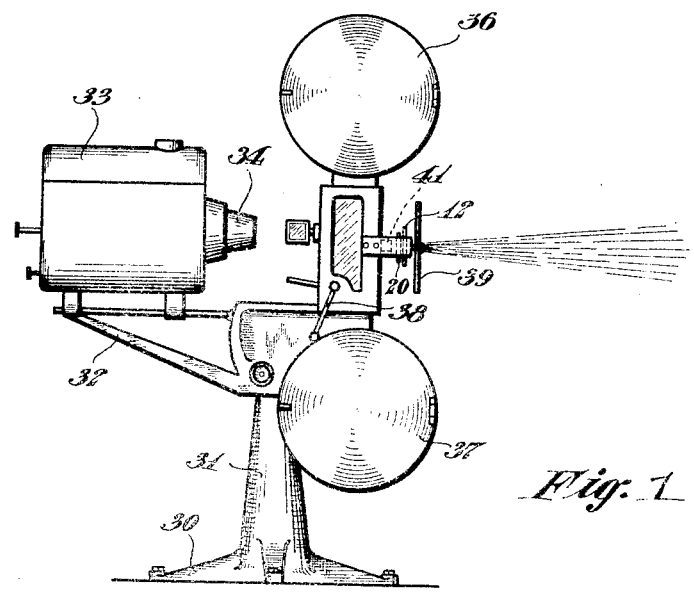
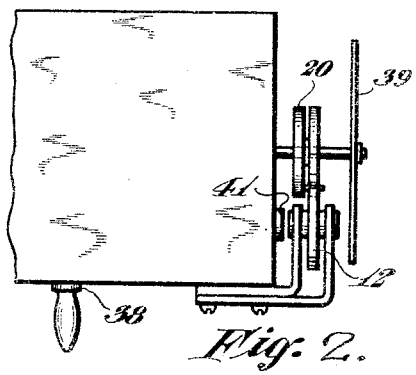
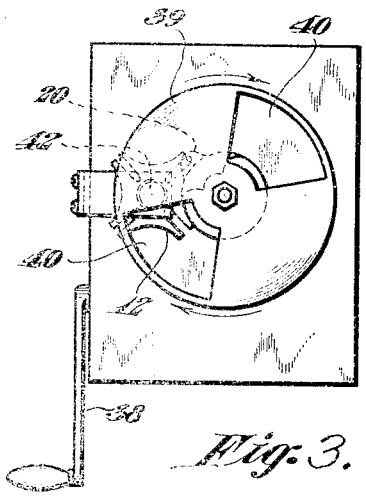
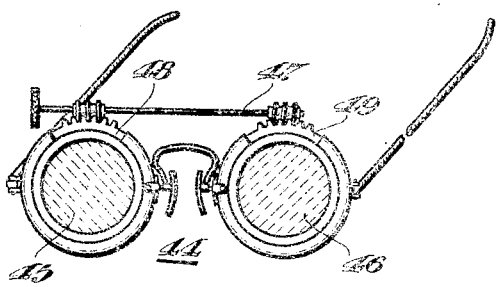

1,879,793

UNITED STATES PATENT OFFICE

LEWIS W. CHUBB, OF EDGEWOOD PARK, PENNSYLVANIA, ASSIGNOR TO RADIO CORPORATION OF AMERICA, OF NEW YORK, N. Y., A CORPORATION OF DELAWARE

MOTION PICTURE APPARATUS

Application filed January 12, 1929. Serial No. 332,100.

My invention relates to motion-picture apparatus and particularly to apparatus for and methods of projecting and viewing stereoscopic motion pictures.

My invention has for one of its objects to provide motion-picture apparatus of improved type for projecting stereoscopic motion pictures.

A further object of my invention is to provide an improved system of projecting and viewing stereoscopic pictures wherein the use of colors is avoided.

A still further object of my invention is to provide a system in which polarized light may be utilized to project and view stereoscopic pictures whereby right and left pictures may be observed by the corresponding eyes of the observer.

It has been proposed heretofore to produce and project stereoscopic motion pictures but the manufacture of the films and the projection of the pictures has been attended with considerable expense and numerous difficulties. It has been necessary, in some cases, to employ films having pictures for the right and the left eye of different colors whereby the projected pictures must be viewed through color screens in order to produce the stereoscopic effect.

In accordance with the present invention, I provide relatively simple apparatus for employing stereoscopic pictures either on a single film or on two films and for projecting the pictures in such manner that they may be viewed by relatively simple apparatus. I propose to polarize the light with which the pictures are projected in such manner that the light for the right pictures may, for example, be polarized at an angle of 90° to the light for the left pictures. When the pictures are viewed through polarizing devices for the right and the left eye that are at the same angles as those of the respective pictures, the eyes of the observer view only the pictures intended for the respective eyes and the stereoscopic effect is thus obtained.

The details of my invention will be described in connection with the accompanying drawing, in which Fig. 1 is a side elevational view of projection apparatus constructed in accordance with my invention;

Fig. 2 is a top plan view of a portion of the apparatus of Fig. 1;

Fig. 3 is a front elevational view of the apparatus of Fig. 2; and

Fig. 4 is a front elevational view of the viewing apparatus.

Referring to Figs. 1, 2 and 3, these views illustrate apparatus for projecting stereoscopic pictures in which right and left pictures alternate. A base 30 has a standard 31 for supporting a frame 32 on which is adjustably mounted a casing 33 for a suitable source of light. The casing 33 has a forwardly extending tube 34 for suitable and usual lenses for transmitting the beam of strong light used for projection.

The film containing the pictures to be projected is transferred from a reel 36 to a reel 37 as it passes across the beam of light. The movement of the film is controlled by the usual operating mechanism including a handle 38, the other details of the operating mechanism not being shown. Geared to the operating handle 38 is a rotatable shutter 39 having apertures 40. Behind the shutter 39 is a lens tube 41 through which the pictures are projected. Between the end of the tube 41 and the shutter 39 is a rotatably mounted transparent polarizing device 42, such, for example, as a Nicol's prism that is carried by an apertured star wheel 12 of a Geneva movement operated by a disk 20 on the shaft of the shutter 39.

This arrangement provides that the polarizer 42 is actuated a quarter of a revolution for each revolution of the shutter 39. Since the shutter is normally arranged to make one revolution for each picture, this mechanism insures that the polarizer rotates through 90° for successive pictures but avoids the necessity for additional gearing as the shutter is standard equipment.

In Fig. 4 is shown suitable means for viewing the pictures projected by means of polarized light. A pair of eye-glasses or spectacles 44 is provided with polarizers 45 and 46 that are adjustably mounted with their planes of polarization at substantially an angle of 90° to each other as indicated by dotted lines. The polarizers 45 and 46 operate as analyzers since their function is to transmit only light that has been polarized in planes corresponding to their angular position. Accordingly, the analyzer for the right eye is arranged to transmit only light from the right pictures and that for the left eye only light from the left pictures. The relative angular positions of the analyzers 45 and 46 may be varied by an adjusting mechanism comprising a shaft 47 having right and left worm gear connections to the respective rings 48 and 49 for carrying the analyzers.

The operation of the projecting apparatus is as follows:

The operating handle 38 is turned to transfer the film containing the pictures to be projected from the reel 36 to the reel 37 and across the beam of light projected from the casing 33 and tube 34 through the tube 41 mounted on the forward face of the projection machine. The shutter 39 is also operated at such speed that it makes one revolution during the projection of each picture in accordance with usual practice.

The picture is changed and the star wheel 12 with the polarizer 42 is rotated 90° while the shutter cuts off the light during the same portions of successive revolutions. Alternate right and left pictures are projected successively through the polarizer 42. The result is that the polarizer is always at 0° or 180° for one kind of pictures, for example the right pictures, and at an angle of 90° or 270° for the left pictures.

The beam of light by means of which the respective right and left pictures are projected are polarized at an angle of 90° to each other. If the pictures are viewed with the eye-glasses 44 comprising the analyzers 45 and 46, the right pictures are viewed with the right eye only and the left pictures are viewed with the left eye only. The result is that the pictures have the appearance of depth since natural vision is simulated or, in other words, bi-vision is produced.

By means of the adjustable feature of the spectacles 44, the angle between the planes of polarization of the analyzers 45 and 46 may be varied in accordance with the location of the person wearing them since it is evident that the planes of the pictures will appear to be at less than a right angle to each other when the observer is not directly in front of the screen.

Preferably, the screen employed in the projection of motion pictures by means of polarized light is of translucent material or has a metallic surface in order that it will provide a specular reflection of the polarized light and diffuse reflection of the light is thereby avoided.

While I have shown and described my invention as utilizing a single film having successive right and left pictures, the principles of my invention may be equally applicable to films having parallel rows with right and left pictures staggered, such as are shown, for example, in the patent to Jenkins No. 606,993. The principles of my invention are applicable also to an arrangement in which right and left pictures either on the same film or on different films may be projected alternately or simultaneously with the respective pictures superposed. In the latter case, the pictures will be selectively viewed through the analyzers as though they were separately or alternately projected.

Furthermore, while I have shown and described the polarizing devices as operated by the shutter for the projection apparatus, any other suitable arrangement may be employed for polarizing the light in different planes according as a right or a left picture is projected. For example, two stationary polarizers may be employed and the pictures either alternately or simultaneously projected through two standard coupled projectors.

The apparatus of my invention is extremely simple in character and the pictures may be produced economically since no special preparations are required in view of the absence of color photography or the coloring of the pictures after the films are made, as has characterized certain of the systems of the prior art.

The foregoing and other advantages will be apparent to those skilled in the art relating to my invention. While I have shown and described my invention in its preferred embodiment, this has been by way of example only and my invention is not to be limited except as expressed in the claims.

I claim as my invention:

1. Motion-picture apparatus comprising mechanism for projecting stereoscopic pictures with light polarized at different angles according as a right or a left picture is projected and means for viewing said pictures comprising two devices for polarizing light at the same angles as those of the light for said pictures and means for adjusting the angle between said two devices.

2. Motion-picture apparatus comprising a projector having film material with right and left stereoscopic pictures thereon and means for projecting said pictures with light polarized at angles substantially 90° apart according as a right or a left picture is projected, and viewing means for observing said pictures comprising polarizing devices arranged at substantially 90° apart whereby only the right and the left pictures may be viewed through the respective devices, and means for adjusting the angle between said devices in order that it may conform to that of the pictures when viewed from various locations.

3. Viewing means for stereoscopic pictures projected by polarized light at different angles for the right and the left pictures, respectively, comprising two polarizing devices whose angles correspond to those of the light for said pictures and means for varying the angles of said devices with respect to each other.

In testimony whereof, I have hereunto subscribed my name this 10th day of January 1929.

LEWIS W. CHUBB.